June 1, 1926.  
E. S. DICKERSON  
1,586,882  
CRANK CASE FRONT BEARING AND SPRING CLIP  
Filed April 17, 1924
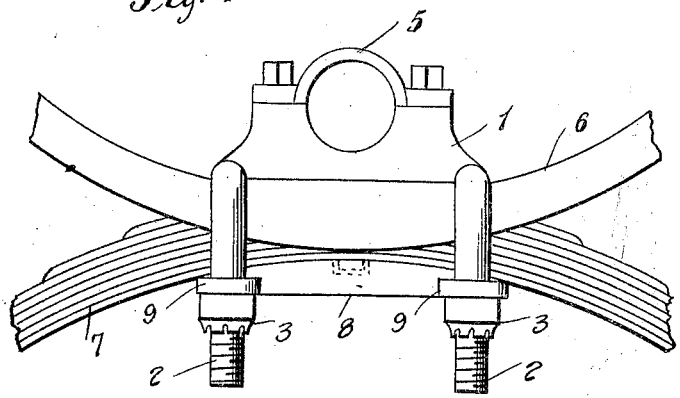
Fig. 1.
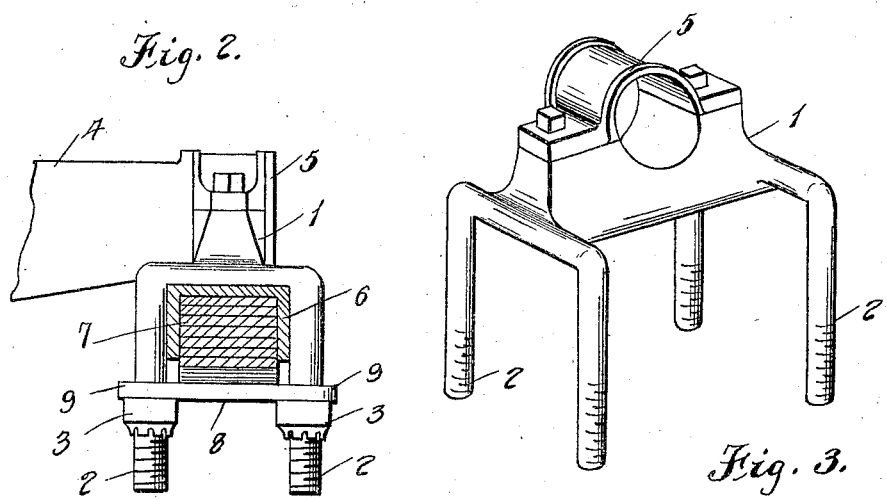
Fig. 2.
Fig. 3.
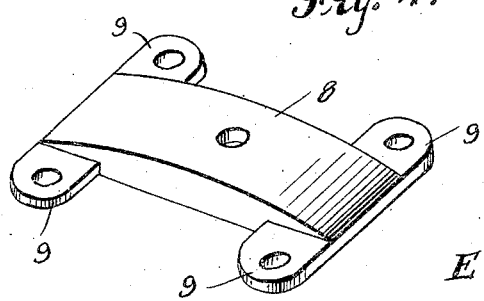
Fig. 4.
Inventor  
E. S. Dickerson.  
By  
Attorney Patented June 1, 1926.

1,586,882

UNITED STATES PATENT OFFICE.

ERNESTUS S. DICKERSON, OF FULLERTON, LOUISIANA.

CRANK-CASE FRONT BEARING AND SPRING CLIP.

Application filed April 17, 1924. Serial No. 707,206.

The purpose of this invention is the reinforcement of the front springs of a motor vehicle, whereby to prevent breaking of the same and to provide a substantial support therefor and for the front bearing of the crank case and at the same time to provide a combined bearing and clip which may be readily placed in position and which provides a substantial support both for the front bearing of the crank case and the front spring of the transverse type such as employed in a Ford automobile.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view showing the application of the invention,

Figure 2 is a side view thereof showing a portion of the front bearing of the crank case, the supporting cross member and the front spring, Figure 3 is a detail perspective view of the upper member of the combined bearing and clip, and Figure 4 is a detail perspective view of the lower member or yoke.

Corresponding and like parts are referred to in the following description and designated in the several views of the drawings by like reference characters.

The front bearing 1 is provided at opposite ends with a pair of rods 2 which are threaded at their lower ends to receive nuts 3. The bearing 1 is recessed in its top side to receive the front bearing 4 of the crank case which is retained in place by means of the usual cap 5 which is bolted to bearing 1 in the ordinary way. The bearing 1, when in position, rests upon the front cross member 6 and the rods 2 extend along the front and the rear of the cross member 6 and the front spring 7, the latter being disposed beneath the cross member 6 in the accustomed way. A yoke or bar 8 is placed against the lower side of the spring 7 and is provided with laterally disposed ears 9 which are apertured to receive the lower ends of the bolts 2, the cross member 6 and spring 7 being clamped between the bearing 1 and yoke 8. The top side of the yoke or bar 8 is curved longitudinally to conform to the curvature of the spring 7 and the lower side is straight and as a result the yoke 8 is fixed at a middle point and gradually diminished towards its ends.

A front bearing and spring clip constructed in the manner disclosed is substantial and provides a reinforcing support for the front spring of an automobile which strengthens the same and prevents breakage thereof as is the case with the ordinary front bearing and spring clip.

What is claimed is:

1. A front bearing and spring clip comprising a supporting member, a cap coacting with said member to form a clip, a pair of depending rods at each end of the supporting member adapted to extend along the front and the rear side of the cross member and front spring, and a yoke applicable from below adapted to receive the lower ends of the rods and clamp the cross member and spring between the said supporting member and yoke, the upper surface of said yoke conforming in shape to the surface of the spring in engagement therewith.

2. A front bearing and spring clip comprising a supporting member, a cap coacting with said member to form a clip, a pair of depending rods at each end of the supporting member adapted to extend along the front and the rear side of the cross member and front spring, a yoke applicable from below having laterally disposed ears at opposite ends to receive the lower ends of the said rods, the top side of the yoke being longitudinally curved to conform to the surface of the spring engaged thereby, and the projecting ends of the rods being threaded to receive nuts.

In testimony whereof I affix my signature.

ERNESTUS S. DICKERSON.